(12) United States Patent
Bota et al.

(10) Patent No.: US 11,552,472 B2
(45) Date of Patent: Jan. 10, 2023

(54) POWER DISTRIBUTION CONTROL WITH ASSET ASSIMILATION AND OPTIMIZATION

(71) Applicant: ORIGAMI ENERGY LIMITED, Surrey (GB)

(72) Inventors: Sorin Bota, Surrey (GB); Oliver Burstall, Surrey (GB); Jerzy Lelusz, Surrey (GB); Matthew Storkey, Surrey (GB); William Winter, Surrey (GB)

(73) Assignee: ORIGAMI ENERGY LIMITED, Cambridge (GB)

( * ) Notice: Subject to any disclaimer, the term of this patent is extended or adjusted under 35 U.S.C. 154(b) by 535 days.

(21) Appl. No.: 16/616,431

(22) PCT Filed: May 24, 2018

(86) PCT No.: PCT/GB2018/051423
§ 371 (c)(1),
(2) Date: Nov. 22, 2019

(87) PCT Pub. No.: WO2018/215785
PCT Pub. Date: Nov. 29, 2018

(65) Prior Publication Data
US 2020/0176984 A1 Jun. 4, 2020

(30) Foreign Application Priority Data

May 25, 2017 (GB) .................................... 1708410
May 25, 2017 (GB) .................................... 1708411

(51) Int. Cl.
*H02J 3/00* (2006.01)
*H02J 13/00* (2006.01)
(Continued)

(52) U.S. Cl.
CPC ............ *H02J 3/003* (2020.01); *G05B 19/042* (2013.01); *H02J 3/004* (2020.01); *H02J 3/06* (2013.01);
(Continued)

(58) Field of Classification Search
CPC ........ H02J 3/004; H02J 3/32; H02J 13/00002; H02J 13/00006; H02J 2203/20;
(Continued)

(56) References Cited

U.S. PATENT DOCUMENTS

| 2012/0029897 A1* | 2/2012 | Cherian | H02J 3/14 |
| | | | 703/18 |
| 2014/0018969 A1* | 1/2014 | Forbes, Jr. | G05B 15/02 |
| | | | 700/295 |

(Continued)

FOREIGN PATENT DOCUMENTS

WO  WO2011085477  7/2011

OTHER PUBLICATIONS

European Search Report—20153687.7-1202—dated Mar. 2, 2020 (J105606EPA).
(Continued)

*Primary Examiner* — Ziaul Karim
(74) *Attorney, Agent, or Firm* — Seyfarth Shaw LLP

(57) ABSTRACT

In a power control system a server maintains asset models that represent asset behaviour, each asset model being in real-time communication with its asset to dynamically inform the model of the status of the asset. A test is performed at the server by issuing a command to an asset requesting the asset to perform a function. Sensors at the asset measure physical parameters at the asset and report these to the server. The server determines whether the asset responded to the command and, if the asset responded, how it responded over time. The server establishes a model for (Continued)

the asset in terms of an energy capacitance and a time constant based on the measured response. An optimizer determines which assets are to participate in which service models. The server sends instructions to the selected assets to attempt to fulfill the services.

20 Claims, 7 Drawing Sheets

(51) Int. Cl.
G05B 19/042 (2006.01)
H02J 3/32 (2006.01)
H02J 3/06 (2006.01)

(52) U.S. Cl.
CPC .......... *H02J 3/32* (2013.01); *H02J 13/00002* (2020.01); *H02J 13/00006* (2020.01); *H02J 13/00022* (2020.01); *H02J 13/00034* (2020.01); *G05B 2219/2639* (2013.01); *H02J 2203/20* (2020.01)

(58) Field of Classification Search
CPC .. H02J 13/00022; H02J 3/06; H02J 13/00034; H02J 3/003; G05B 19/042; G05B 2219/2639; Y02B 90/20; Y02E 60/00; Y02E 60/7807; Y04S 10/50; Y04S 20/00; Y04S 10/14; Y04S 40/12; Y04S 40/20
See application file for complete search history.

(56) References Cited

U.S. PATENT DOCUMENTS

2014/0330695 A1* 11/2014 Steven ............... G06Q 30/0283
705/37
2016/0156188 A1* 6/2016 Baba ........................ H02J 3/32
700/296
2016/0281607 A1* 9/2016 Asati ........................ F02C 7/26
2017/0364043 A1* 12/2017 Ganti ..................... G05B 17/02

OTHER PUBLICATIONS

U.K. Search Report—GB1708410.4—dated Sep. 21, 2017 (J105606GB).
European Paten Office; Examination Report of Application 20153687.7, dated Jul. 5, 2021, 5 pages.

* cited by examiner

POWER DISTRIBUTION CONTROL WITH ASSET ASSIMILATION AND OPTIMIZATION

FIELD OF THE INVENTION

The present invention relates generally to the field of electrical power control systems, and more particularly, to systems, methods, and apparatus embodiments for optimizing allocation of assets to power management and other functions and control/behaviour of those assets to actively manage power supply and demand and other priorities in an electric power grid.

DESCRIPTION OF BACKGROUND ART

International Patent Application WO2016/027041 describes a power distribution control system having a string of power assets comprising at least two different power assets selected from sources, stores and responsive loads. Each asset has an associated local router. The assets and associated routers communicate with a central server and attempt to fulfil high level aims of the server by negotiating times and quantities of power transfer between themselves. Parameters in relation to the power assets are stored in a database. A control system at the server anticipates future activity in the grid, such as future peaks in demand or supply, and local power assets prepare in response. The power assets communicate between themselves on a peer-to-peer basis and collectively confirm to the server their ability to modify their collective behaviour in response to an event in the grid.

Responsiveness to events in the grid is an example of a service. As well as serving a primary function at a local level—e.g. heating or cooling a building, or refrigerating goods, or generating power (renewable or otherwise) or storing energy—an asset can, alone or in combination with other assets, provide a service to the grid (i.e. operate in a service model) in which some secondary function is delivered at the level of the grid. Provision of a responsive load is an example of such a service.

Thus, an asset can participate in a local function, its primary function, in which it operates under local control, typically in a local control loop that has a set point such that the asset is driven (ON and OFF or UP and DOWN) to track the set point, while at the same time participating in a secondary function that is a grid function or wide-area function, in which its operation is influenced by the control system at the server, e.g. by influencing the timing of tracking of the set point or by moving the set point (within limits that do not fundamentally compromise or unduly compromise the primary function). The secondary function is referred to herein as a "service". The modelling of that service at the server is a "service model".

GB1515911.4 describes a responsive load system using refrigeration loads controlled by means of local control loops in response to local thermostats. A server may intervene in the operation of the responsive load. This may comprise overriding the local control loop an individual refrigeration load. As long as the operating thresholds of the refrigerators are not exceeded or violated, i.e. the temperature is kept within a range between pre-determined maximum and minimum values, the system provides a responsive refrigerator bank that can lead to cost saving in terms of being highly responsive to power fluctuations in the power grid. Additionally, the server can plan and modify the behaviour of the compressors of the refrigerators.

Responsive loads can be responsive at very short notice (e.g. to a locally measured drop in grid potential and/or frequency) or can be responsive to events that change more slowly (e.g. cloud cover occluding or uncovering a solar farm) or in a planned manner (e.g. being available to absorb power from a solar farm during a midday-period). Each of these examples represents a service.

More generally, a service is the provision of some physical power service, particularly to the grid operator (but possibly to owners of assets connected to the grid), that overlays the basic operation of the grid in its primary function of delivering power to loads. Services generally fall into the categories of power based services, energy based services and reliability based services.

Assets may contribute to services that are responsive or planned. For example, avoiding energy wastage in the grid can be considered a service. Similarly, extending the lifetime of a grid substation by minimizing the generation, by assets, of harmonics in the grid can be considered a service. The assets must perform their primary function (e.g. driving a machine in a factory or generating power with a smooth sine-wave) but they can be guided to so in a low-harmonic manner by a server, and that secondary function has benefit to the operator of the grid (because it reduces heat generation in the substation, thereby avoiding wastage and also extending the lifetime of the substation).

Aris Dimeas et al: "*Microgrids Control Issues*", 26 Dec. 2013 describes microgrids in which a local controller (MC) takes into account the operational cost function of a microsource, a profit margin sought for by an owner of a distributed generation (DG) unit, and the prices of the external market provided by a microgrid central controller (MGCC). The MGCC is said to "optimize" the microgrid operation according to the external market prices, the bids received by the DG sources and the forecasted loads. It sends signals to the MCs of the DG sources to be committed and, if applicable, to determine the level of their production. Control of the balance of supply and demand by controlling the price of energy is extensively discussed in the literature. In a bid/offer system, an asset either offers to participate at a bid price or participates at an offer price. At the agreed price, the asset performs its primary function (it performs heating or cooling or generates electricity or stores it etc.)

Similarly, US2014/0018969, proposes a reporting infrastructure for control by a grid operator and proposes "active supply clients" for management of electric power available to the electric power grid, whether by generation source supply elements or by storage source supply elements (such as battery, fuel cell, compressed air, stored water or the like), with the aim of generation balancing so that storage devices serve to stabilize and regulate renewable energy resources, or with the aim of optimization according to various factors such as cost, timing, price, market conditions and the like.

Optimization of a microgrid operation according to the price of energy (and anticipated price) is merely optimizing to one parameter in a complex system. That complexity can increase many times and in many dimensions when one considers that generating and consuming energy are merely two services among many other possible services.

Moreover, a given asset can participate in delivering more than one service (operate in more than one service model). Immediate delivery of a service may preclude that asset from participating in a service model at a future time (and vice versa). An asset that is planned to be participating in a service model may cease to do so (because of changes in circumstances or because of responsiveness by participation in a different service).

The problem of optimization of provision of services can be broken down into time periods (e.g. a day or an hour or a half-hour). The finer the granularity of optimization, the greater the potential benefit, but also the greater the computational burden. If the problem is to be broken into short (e.g. half-hour) increments, it is essential that any optimization algorithm can complete its calculation in a time substantially shorter than the time increment. Otherwise there will be insufficient time to deploy the optimal allocation of assets to service models and have those assets provide those services, before the next time increment. Time must also be allowed for latency in client-server reporting and control arrangements.

SUMMARY

A power control system is provided, in which a server maintains asset models that represent asset behaviour, each asset model being in real-time communication with its asset to dynamically inform the model of the status of the asset. A test is performed at the server by issuing a command (request) to an asset requesting the asset to perform a function. Sensors at the asset measure physical parameters at the asset and report these to the server. The server determines whether the asset responded to the command and, if the asset responded, how it responded over time. The server establishes (or updates) a model for the asset in terms of at least an energy capacitance and a time constant based on the measured response.

The command may be a request to the asset to turn ON if OFF or a request to turn OFF if ON. Alternatively, a command may be to set a specific behaviour vis-à-vis the grid, such as to set a required power level The server can repeat the test at different delays to establish a recovery time for the asset—i.e. at different delays vis-à-vis a first test.

In this way, the server may model a charge envelope for a load or store and a discharge envelope for a store or source.

The server may repeat a test to determine a probability that an asset will respond to a given command from the server.

Means are provided for communicating instructions to the selected assets to participate in the service to influence their behaviour over a set period, e.g. the immediately following 30 or 60 minutes.

A probability of delivery of a service may be set as an input parameter to the system.

A method of controlling a power distribution system is also provided, comprising: maintaining asset models that represent power asset behaviours, each asset model being in real-time communication with its asset to dynamically inform the model of the status of the asset, wherein each asset model has a distribution of probable behaviour for its asset; maintaining at least one service model for a desired service and mappings that map to the service model assets that have a possibility of fulfilling the service; searching for optimal combinations of assets to fulfil the service by stacking the distributions of asset behaviours of a group of assets to determine an overall probability of combined asset behaviour; selecting assets to fulfil the service based on the overall probability for the group; and communicating instructions to the selected assets to participate in the service to influence their behaviour over a set period.

The selecting of assets preferably comprises selecting assets that will, to a set probability, fulfil the service. It preferably comprises selecting more assets than the minimum possible to deliver the service.

The method preferably includes updating, in real time, the probability distribution for each asset model by communication with the respective asset. This is facilitated by determining whether, in a preceding period, the asset responded or did not respond to a command from the server. This can be done many times over many periods to establish the probability distribution.

In accordance with another aspect of the invention, a server maintains asset models that represent asset behaviour, each asset model being in real-time communication with its asset to dynamically inform the model of the status of the asset, wherein each asset model has a distribution of probable behaviour for its asset. One or more servers maintain at least one service model for a desired service and maintain mappings that map to the service model those assets that have a possibility of fulfilling the service. An optimizer searches for combinations of assets to fulfil the service by stacking the distributions of asset behaviours of a group of assets to determine an overall probability of combined asset behaviour and selects assets to fulfil the service based on the overall probability for the group.

A power control system is also provided for controlling a set of power assets connected to a grid, in which each power asset has a local controller for controlling the asset under a local control loop and is capable of receiving instruction from a server to influence its operation in accordance with a service model process controlled by the server (i.e. a secondary process that is modelled and controlled by the server). The server maintains asset models that represent asset behaviour, each asset model being in real-time communication with its asset to dynamically inform the model of the status of the asset. It also maintains multiple service models that represent service model (i.e. secondary) processes that involve different power assets; and maintains mappings that map assets to service models, each corresponding to a secondary process that can be fulfilled by those assets. An optimizer is provided for determining which assets are to participate in which secondary processes (and thus determine which asset models are to participate in which service models). The server sends instructions to the selected assets to attempt to fulfil the services. More specifically, for each secondary process the server chooses to perform at a given time, the server sends instructions to the selected assets that are, as a result of the optimization, mapped to that service, to request or influence those assets to achieve that service.

Instructions received by an asset from the server influence operation of the asset without departing from local boundary conditions of the asset's local control loop.

A method of controlling a set of power assets connected to a grid is also provided. The method comprises: maintaining, at a server, asset models that represent asset behaviour, each asset model being in real-time communication with its asset to dynamically inform the model of the status of the asset; maintaining multiple service models that represent services that involve different power assets, and mappings of assets to service models for services that can be at least partly fulfilled by those assets; determining an optimum disposition (allocation) of assets, including selecting assets to fulfil services modelled by the service models; and communicating to the selected assets instructions to attempt to fulfil the services.

Each service may be provided over a set period (e.g. 30 minutes) starting from receipt of the instructions by the assets, and the instructions are valid for the set period. The step of determining an optimum disposition may comprises performing a search across possible dispositions for a cycle (e.g 24 hours) that is many times longer than the set period.

The step of optimizing includes predicting, by the asset models, the statuses of the assets at a future time after conclusion of the optimization and/or communication to the selected assets.

Preferred embodiments and examples are now described, by way of example only, with reference to the drawings.

DESCRIPTION OF PREFERRED EMBODIMENTS

Figure 1:
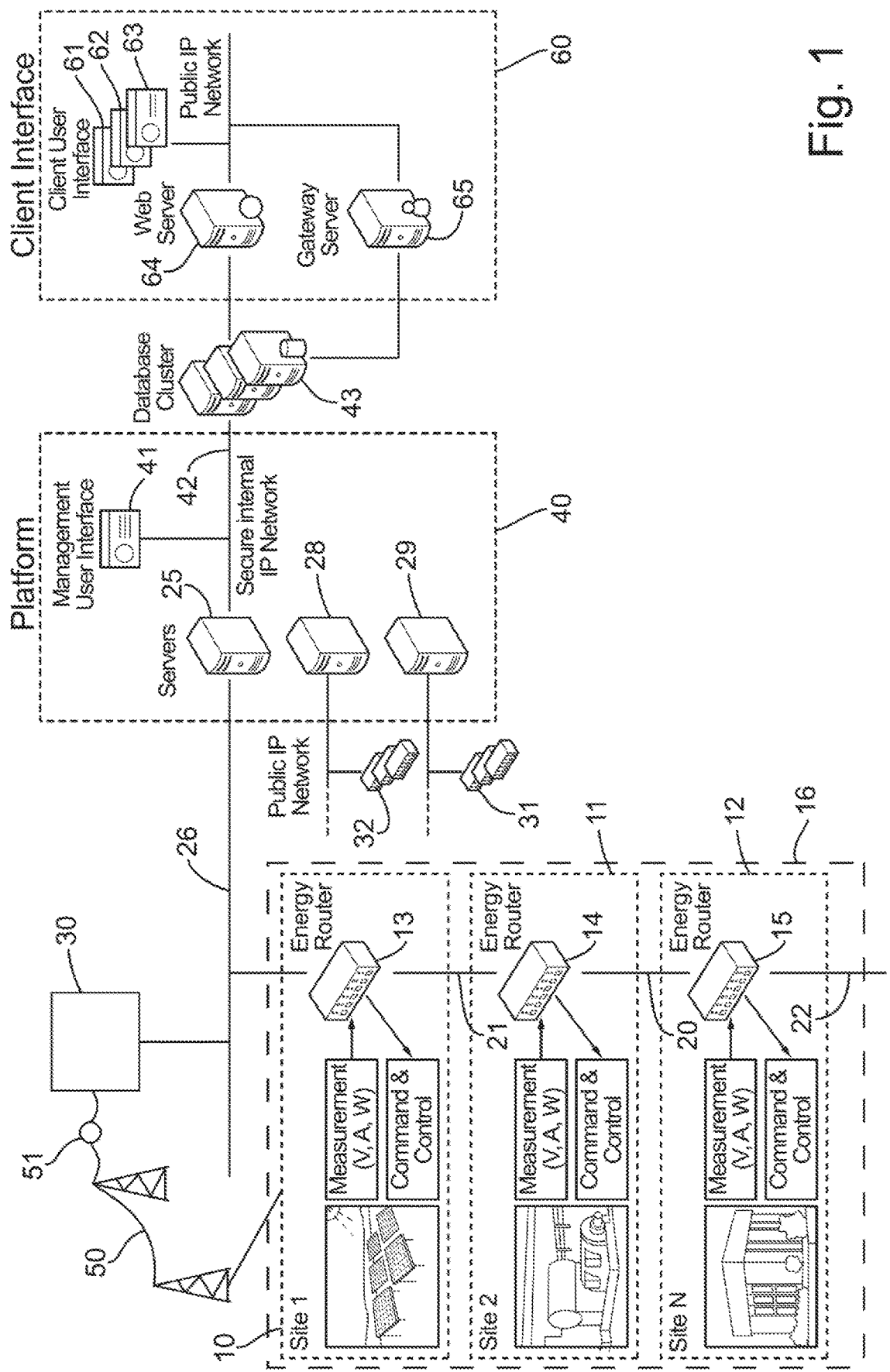
FIG. 1 is an illustration of part of an overall system in accordance with embodiments of the invention.

Referring to FIG. 1, a system is illustrated showing a number of discrete sites or power assets 10, 11 and 12, each having an energy router, 13, 14 and 15 respectively. The energy routers are illustrated as being connected to each other by IP connections 20 and 21 and being connected to a server 25. Other sites or power assets may be included with routers connected to routers 13, 14 and 15.

In an example, site 10 may be a power source, such as a solar farm, site 11 may be a responsive load, such as a thermal load (heating, air conditioning, refrigerating or other thermal load) and site 12 may be a storage site to be described below. Hereafter the term "asset" will be used to refer to a power asset (load, source or store) that is connected to the grid and draws power from the grid or supplies power to the grid or both and has a router in communication with the server 25 for independent control or influence (directly or indirectly) by the server 25 (or one of the servers).

Additional strings or clusters of assets may be connected to server 25 across IP network 26. A "string" is simply a group of assets logically grouped by the server 25 to achieve a certain service determined by the server while independently achieving the individual purposes of the individual assets. A "cluster" is also a group of assets, logically grouped by the server 25, that is anticipated to behave (but may not in fact behave) collectively in a manner predicted or modelled by server 25. String 30 may, for example, be a balanced string of assets and clusters 31 and 32 may, for example, be responsive loads. The various assets connect to server 25 or to other servers 28 and 29.

A "service model" is a computer description of a service. Thus, the server 25 maintains models (asset models) of each primary function of each asset and, separately, maintains models of each secondary function (service). The latter models are dependent on the former models. Of course, these various models may be maintained in separate servers in communication with each other.

Together servers 25, 28 and 29 form a control platform 40 under the management of a management user interface 41. The servers connect via a secure internal IP network 42 to a database cluster 43. This database cluster contains extensive information about all the available sites in the system, with detailed parameters of those sites in terms of their energy requirements and capabilities, as well as details of the energy grid connecting these sites together and connecting these sites to other clusters such as clusters 31 and 32. For example, the database contains, for each asset: (i) its topological position in the power grid relative to other power assets, (ii) its power needs or delivery capability, and (iii) parameters indicative of how flexible are those power needs or capabilities. The database may store time characteristics of the power needs or capabilities and flexibility parameters. It may additionally store parameters reported by the power assets indicative of real time needs or capabilities and permissible variations on those needs or capabilities.

By way of example, the grid 50 supplying power to sites 10, 11 and 12 and to cluster 30 may have a pinch point 51 in the form of some connection, substation or switch, which has a particular rating specification or limit. Such information is stored in database cluster 43.

A client interface 60 is provided for client users 61, 62 and 63 to access a web server 64 (with, optionally, a gateway server 65). The client user interfaces 61 to 63 connect by the public IP network to the web server 64.

In operation, site 10 generates power and feeds this power to the grid 50. Site 11 consumes power, which it draws from the grid 50 and site 12 stores power from the grid 50 or delivers power to the grid 50, as will be described. In operation, sites 10, 11 and 12 can, according to one example of a service model, exchange energy at a local level to locally balance the electrical system so that it effectively works like a micro-grid. They may, for example, provide a service by which the group has no net flows of energy in or out of the grid 50 or maintains a steady net flow of energy in or out of the grid 50 and balances fluctuations that would otherwise need to be supplied from a rapid response power station in the grid 50. By a "steady net flow of energy" is meant a flow of energy that has a rate of change that does not exceed a certain upper limit, for example 50 MW/min (being a rate at which an open cycle gas turbine, OCGT, is necessary), and more preferably does not exceed 8 MW/min (a rate of change that calls for a coal fired generator or an OCGT or other responsive generator). By balancing the requirements and capabilities of sites 10, 11 and 12, the ramp rate of demand on the grid 50 is kept at a base level, at which long-term slow-changing power sources such a nuclear generator can maintain a steady net flow of energy.

Similarly, string 30 comprises a mixture of two or more of the three types of site: sources, responsive loads and stores. Thus, string 30 similarly maintains a controlled rate of change of demand from (or supply to) the grid 50. Notice that by maintaining these separate balanced strings on each side of the pinch point 51, the specification at that point is satisfied. The pinch point 51 may be a substation or a feeder (i.e., a cable from substation to substation, or from substation to load). It may be permanent or temporary. E.g. a fault may be reported indicating some rating limitation in a distribution cable that is only a problem under particular circumstances. This fact, the logical location of the fault, the relative locations of the assets on either side of the pinch point, the limitations imposed by the pinch point and the circumstances may be stored in database 43.

Controller 25 supplies parameters to routers 13, 14 and 15, influencing the manner in which those routers control their respective sites to provide or demand power (details of which are described below). Additionally, server 25 allocates sites to balanced string 16 or balanced string 30, or removes sites from those respective balanced strings, according to longer term fluctuations, described in greater detail below.

The platform 40 is able to control servers 25, 28 and 29 to in turn influence various strings (which may be balanced or not) within their domains to achieve overall objectives (service models), such as reduction of peaks in demand or temporary redistribution of supply and demand, for example in times of grid maintenance. The servers 25, 28 and 29 have access to the data on the database cluster 43.

As new sites wish to benefit from the platform 40 they can be added by means of management user interface 41. Details of the respective energy assets or loads can be entered into the database cluster 43. Database cluster 43 also stores any trading related data such as peak and off-peak energy prices. These may be fixed (from year to year or month to month) or dynamic (changing from hour to hour) or based on a TRIAD scheme (not known until the end of the peak season). In the case of TRIAD pricing, database cluster may have information about probable peak times and probable pricing at those times. In each case, such information will influence the parameters sent from the server to the routers in any given cycle. In the case of dynamic pricing, a change of pricing may trigger a new cycle of parameters from the server to the routers.

Figure 2A:
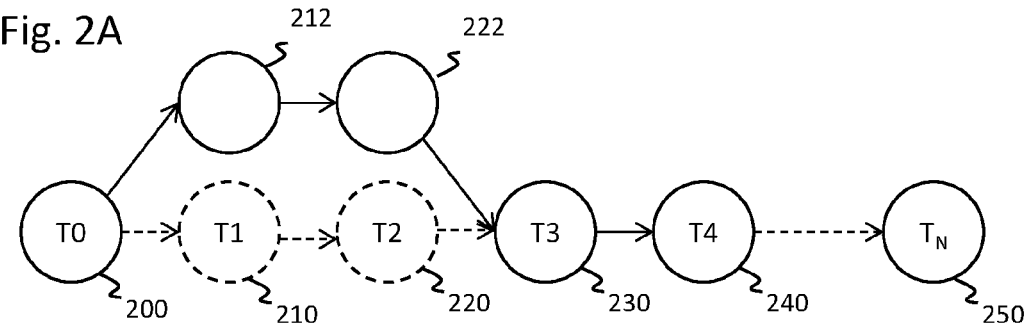
FIGS. 2a-2d are state diagrams illustrating possible states of an asset over a 24-hour period.

Referring to FIG. 2A, a sequence of energy states for an asset 10, 11 or 12 is shown. The horizontal axis represents time and the vertical axis represents some change in the asset (such as an increase or decrease in energy or entropy). The state of the asset is determined at time T0 and is projected/modelled at regular intervals and will be determined at those future times. These may be every 15 or 30 minutes or every hour or every few hours or every 24 hours. Shorter time periods between assessing the state of each asset can give greater flexibility and efficiency of use of assets, but also increases the communication burden between routers and server and increases the computational burden at the server to determine all the states of all the assets and find an optimal disposition (allocation) of assets to service models into the future. The preferred interval is every 30 minutes. Some assets may not be able to report every 30 minutes (or may not change over a 30 minute interval, in which case these assets may report less frequently, e.g. every hour, every 6 hours or once per day).

As shown, state 200 is the present state and states 210, 220, 230 and 240 are future states of the asset at times T1, T2, T3 and T4. Each future state is a projected future state. State 250 is the projected state at time N—i.e. at the end of a present forecasting cycle, which may be 6 hours or 12 hours or 2 days or a week, but is preferably 23.5 or 24 hours.

As shown in FIG. 2A, the asset may have one of two different states (210 or 212) at time T1. For example, it may be a refrigerator that has turned on its compressor(s) between time T0 and T1 so that at time T1 it is in a cooler state, represented by the solid line transition to state 212.

Alternatively, it may be a heater (e.g. a building or swimming pool) that has turned on between times T0 and T1 and at T1 is in a warmer state. For explanation purposes and for simplicity, only two possible states are illustrated (210 and 212), but it will be noted that an asset can have may possible states at a given time (e.g. different levels of temperature) or an asset such as a battery/store can gain energy or give up energy to move into a higher energy state or a lower energy state.

As illustrated by the solid lines in FIG. 2A, the case is shown where this asset passes from state 212 to state 222 which is similar to state 212, e.g. a similar temperature. For example (in the refrigerator case), the compressors may have been activated again between times T1 and T2 to maintain the same low temperature (or continuously from time T1 to T2). After time T2, the asset is allowed to return to its original state (e.g. it is allowed to warm up or cool down to its original temperature state). The transition from one state to another may represent an injection (or extraction) of energy or a change in resultant physical property (e.g. in a refrigerator, transition to states 212 and 222 may represent two measures/quanta of injected energy or extracted heat).

Figure 2B:
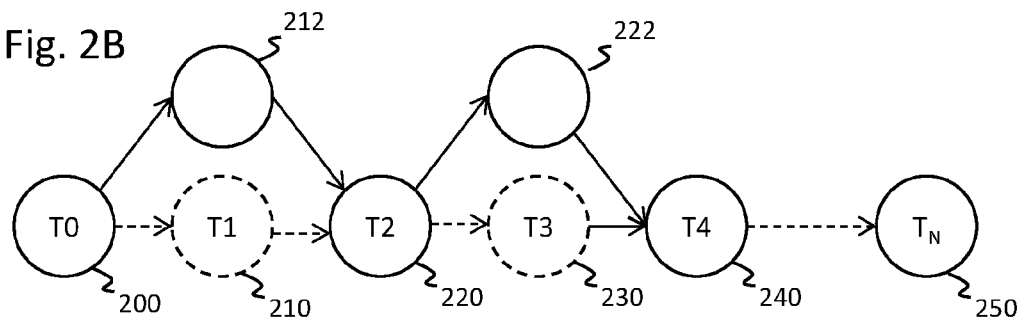

Turning now to FIG. 2B, the same system is illustrated but following a different path. In this case, the asset proceeds from state 200 to state 212, as before, but then it is allowed to return to its original state 200 at time T2. From state 220, the asset is operated as before to cause it to transition to state 222 and then return to state 240 (similar to states 200 and 220) at time T4. Thus, the asset can reach state 240 at time T4 via two different paths. For example it can have undergone two consecutive cooling operations, or two cooling operations separated by a 30 minute interval. In each case the result is (approximately) the same—the asset reaches time T4 at a certain state, e.g. a required state at that time. It may be, for example, that by the first path the asset cools further before warming up (or warms further before cooling down) but in so doing does not stray outside its local control loop operating parameters—e.g. its local minimum and maximum temperatures or local minimum and maximum states of charge.

Figure 2C:
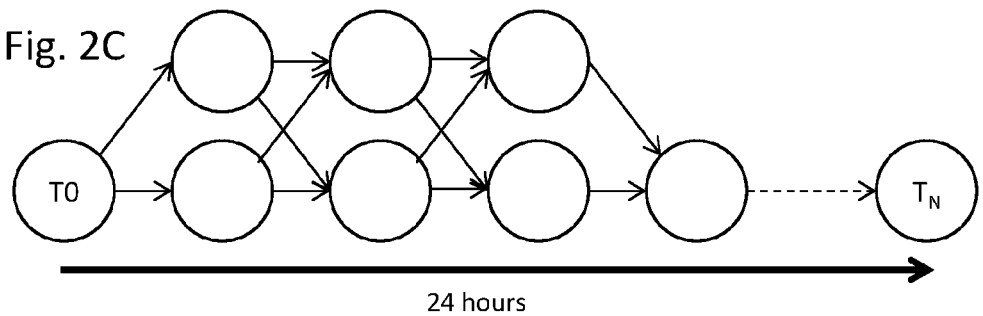

Referring to FIG. 2C, the inventors have identified that there may be many paths between operating states that an asset can follow in the projected future. Whether an asset proceeds along one path or another may be determined by the server 25—i.e. the server can issue a command to the asset's router to cause the asset to make a transition at a given time. Note that if this occurs, an asset may return to its earlier state (prior to the transition) of its own accord under its own local control loop or may do so under command of the server. Accordingly, the inventors have identified that a useful approach to optimizing the allocation of assets to service models is a path search optimization approach.

Figure 2D:
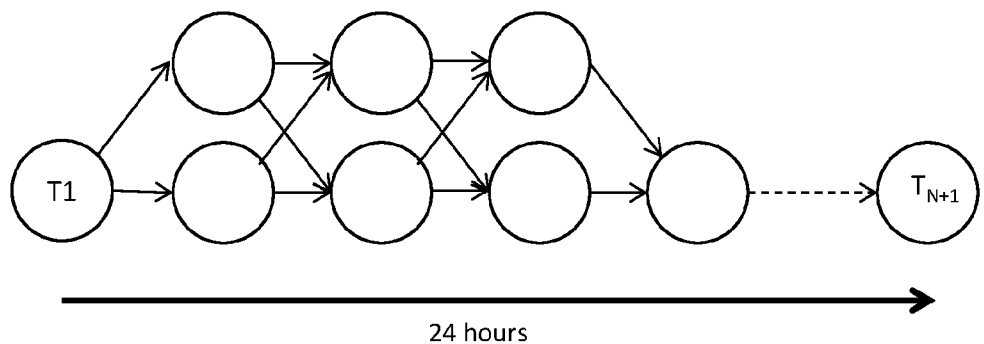

FIG. 2D illustrates a new set of possible states re-calculated at time T1. The server models the behaviour of the asset for a new 24-hour period (or other cycle) and projects forward to time $T_{N+1}$. (More particularly, time is re-set to time T0 and a new set of states are modelled through to time $T_N$). The asset model is projected forward for the full time cycle. For some assets (or combination of assets), the benefit of following one path versus another path can be determined only over the full cycle. E.g. in the case of a solar farm in combination with a bank of batteries, the behaviour is preferably modelled over a full solar cycle (taking into account projected weather information as necessary).

Preferably the server stores path rules for assets, limiting the possible paths for an asset. E.g. the server may "know" from its model of an asset and from the stored parameters for an asset that it cannot undertake the same action multiple times over consecutive time periods—e.g. it cannot be caused to cool down over a certain number of consecutive cycles (because the contents of the refrigerator would freeze) or it cannot be allowed to remain dormant for a certain number of consecutive cycles (because the contents may thaw or perish). More generally, the rules may define that a given first action must be followed by a second action within a given period of time or the first action may not be followed by a second action within a given period of time.

Note also that some other stimulus (outside the local control loop) can cause an asset to transition, and such transition may be under instruction from the server to do so at a time that is out of the server's control and is delegated to the router. E.g. (as described in WO2016/027041), the local asset may respond to a change in mains voltage or frequency as measured at the asset by absorbing energy from the grid or returning energy to the grid or postponing operation that would otherwise be called upon by the local control loop.

As can be seen, a single asset may transition from state to state over a cycle along many paths. When there are many assets in a group (string or cluster), the number of possibilities for the progression of the states of all the assets in the group is very much larger. It is the task of the server to optimize the deployment of assets to service models to maximize the fulfilment of service models. Adding more service models to a population of assets has value, because more objectives can be achieved from the same set of assets. The task of optimizing can be facilitated by mapping asset to service models—i.e. forming groups of assets, where each group is allocated to fulfil a certain service model, but this merely re-states the problem as a problem of allocating assets to groups.

Mappings are a set of rules that allow certain assets to fulfil certain services. They preferably include geographical information and topological information, so that they identify which assets are sufficiently geographically close to which other assets to be able together to fulfil a service and which are not, as well as which are connected to do so and which are not. Services are typically limited in geography or topology. E.g. where there is a need to provide a certain level of responsive load (e.g. 1 MW for 30 minutes) in a certain part of the country, that is an example of a service. If there is a similar need in a different part of the country, that can be a different service. Providing a further level of the same service (e.g. another 1 MW for the same 30 minutes) can be considered a separate service (or the two can be combined into a single service to provide 2 MW for 30 minutes).

Mappings have a time dimension. A set of mappings between assets and service models for one period (e.g. a 30-minute period) may be different from the mappings between the same assets and the same service models over a different time period. This is in part because mappings can be updated as assets come in and out of service or as assets change their status and become available or unavailable for different service models.

Figure 3:
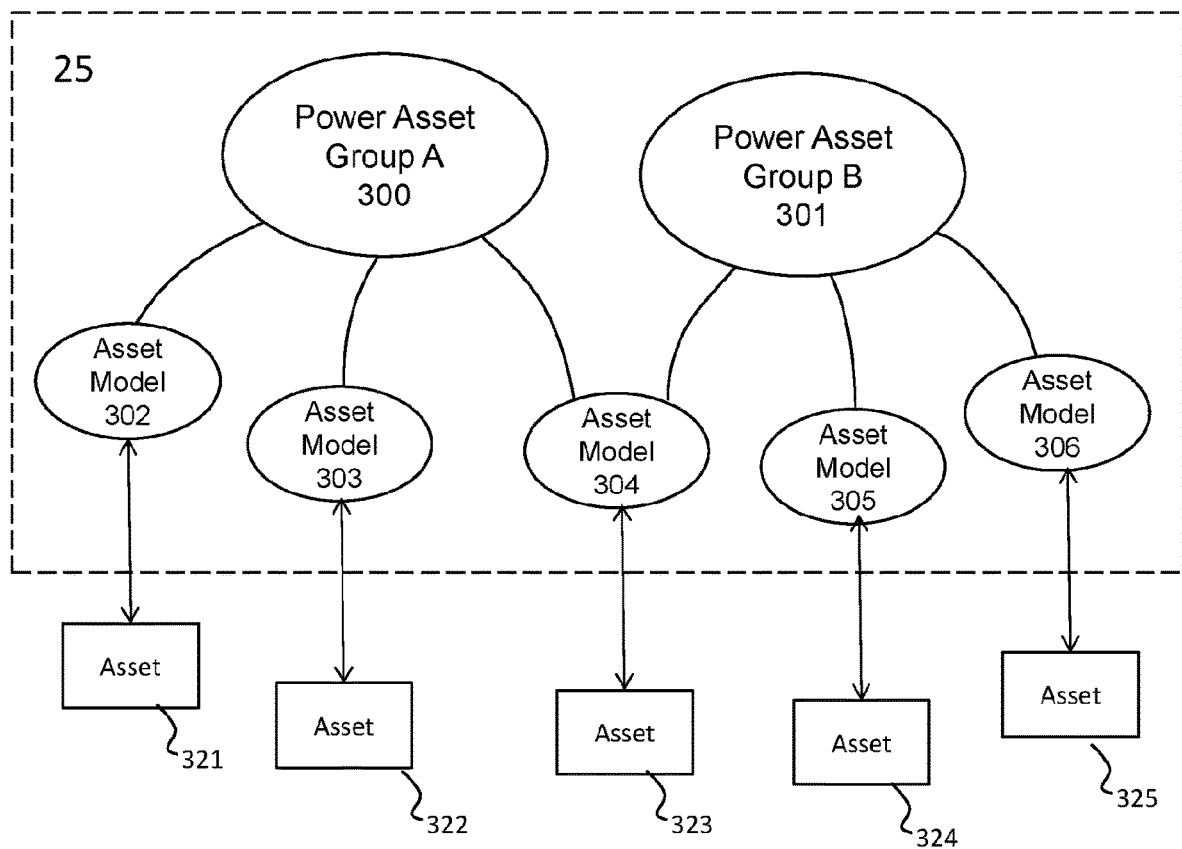
FIG. 3 illustrates an example of a number of assets in communication with corresponding asset models.

The inventors have realized that a given asset can be allocated to more than one service model at the same time. This is illustrated in FIG. 3, in which the server 25 maintains models 302-306 modelling the behaviour of assets 321-325 respectively. Each asset can be modelled as equivalent to a battery or store (as will be described below). Each model maintained in the server 25 is in communication with its respective asset through the router associated with that asset. Accordingly, each model is kept up-to-date with the physical state of its asset.

It is a task of the server 25 to determine what the assets are to do for the next service model period (typically the next half-hour). Although it is not necessary for the server to allocate assets to service models, it is convenient to consider the server as "allocating" the assets in groups to fulfil different service models.

In FIG. 3, two groups 300 and 310 are shown, labelled group A and group B respectively. There may be many such groups (preferably just one group per service model). A group may comprise a single asset (e.g. a gas turbine power station may have its own service model), but often a service model will require a group of plural assets to fulfil that service model. For example, to provide a responsive load of 1 MW it may be necessary to form a group of several responsive loads of tens of kW or a few hundred kW each. Similarly, a group of assets including assets (such as batteries) that have a fast but short response can be grouped with other assets (such as combined heat and power units) that have a slower but more enduring response so that together they provide a certain time envelope of responsiveness.

As can be seen in FIG. 3, there is at least one asset 323 that is allocated to group A and group B simultaneously. Its corresponding asset model is incorporated in each group. There may be several assets that are common to two groups. An asset may be assigned to more than two groups at the same time. Assets of a group may simultaneously be assigned to two or more other groups.

There may be service models that are "orthogonal" in that fulfilment of one service model by an asset does not affect its ability to fulfil another service model. E.g. there may be a short term service model and a long term service model. The short term may be over a matter of a number of milliseconds or seconds and the long term may be over a full time period between measured transitions (e.g. 30 minutes). Or the short term may be over a matter of minutes and the long term over some hours. For example, an asset may be responsive to short term fluctuations in grid frequency and voltage (a service model that gives benefit) and at the same time be available to balance supply and demand across a longer period (e.g. the period over which a back-up coal-fired generator can be brought into use—a service model that also gives benefit). Other examples of orthogonal service models include addressing the need for capacity in the grid while addressing the need for responsiveness to frequency changes.

Some service models are mutually exclusive. For example a frequency response service model and a triad pricing service model are mutually exclusive. An asset cannot be assigned to both. If an asset were assigned to both and the asset were to respond to a drop in frequency (due to a sudden increase in demand) it may do so during the very hour (or half hour) when demand is at its highest and this will trigger the higher pricing that a triad pricing service model is trying to avoid.

The inventors have also realized that a given asset may be assigned to two or more service models that are not strictly orthogonal, but can overlap. Such is the case when fulfilment of one service model by an asset may leave unaffected that asset's ability to fulfil another service model (or may simply reduce its probability of participating in the second service model if called upon to do so by the server). In such cases the availability of the asset to fulfil the second service model depends on whether and in what circumstances the asset is called upon to take action towards fulfilment of the first service model. E.g. an asset may serve as a responsive load in two service models at the same time. E.g. it may provide excess capacity to both service models, i.e. capacity in excess of the minimum required to fulfil the service model. If the asset is called upon to be responsive (e.g.

absorb excess energy) on account of its allocation to a group of assets assigned to the first service model, it will at that time cease to be available to fulfil another responsive load service model (or its probability of participating will fall). This may merely mean that at the next time period when the assets are assigned to service models, that particular asset is temporarily unavailable and cannot be assigned to any responsive load service model.

A point to note here is that at time T0 the asset may be assigned to two service models. At time T1 the assets report their conditions to the server (or the server polls the assets) and at this time the server determines that the asset can no longer be assigned to either service model. The server re-sets its calculations (time is re-set to time T0), performs another round of optimization and computes another set of asset allocations to service models. This time the asset is not assigned to those service models (it might be assigned to a different service model).

In order to determine an optimum allocation of assets to different service models (especially orthogonal service models), it is necessary to normalize the benefit of fulfilling each service model to a common scale. Accordingly, weighting factors are applied to different service models to normalize them to a common scale. E.g. one service model may aim to avoid wasted power during a time of peak solar generation while another service model may aim to avoid wasted power through $I^2R$ heating in a transmission line or substation—such service models are already measurable on a common scale (power), but may still require normalization (e.g. to normalize between benefits of peak power and off-peak power). Other service models may call for aims that are not measured in units of power, such as avoiding wear and tear on equipment (e.g. extending battery lifetime) or avoiding provision of peak capacity, in which case these aims must be given weighting factors so that they all service models can be compared on a common scale (e.g. peak power or its equivalence in benefit) for optimization purposes.

This ability to allocate an asset to more than one service model further increases the complexity of the optimization process. It vastly increases the number of paths that can be followed by all the available assets through all their respective states across a full cycle. Indeed, the number of possibilities for allocating assets to service models is so vast that it is a challenge to identify an optimum allocation of assets to service models in one time increment, i.e. the time available before a new calculation is due. Thirty minutes is not a very long time in which to perform an optimization calculation without engaging supercomputing resources. Within the limits of the calculating power of an ordinary computer (or using cloud computing), the calculation should preferably be completed within a few minutes. If it takes this long or longer, a significant portion of each time increment is used up simply calculating the optimum disposition of assets for the forthcoming time interval.

There is a need for a system for deploying an optimum allocation of power assets to service models that can be calculated and deployed without undue delay.

Figure 4:
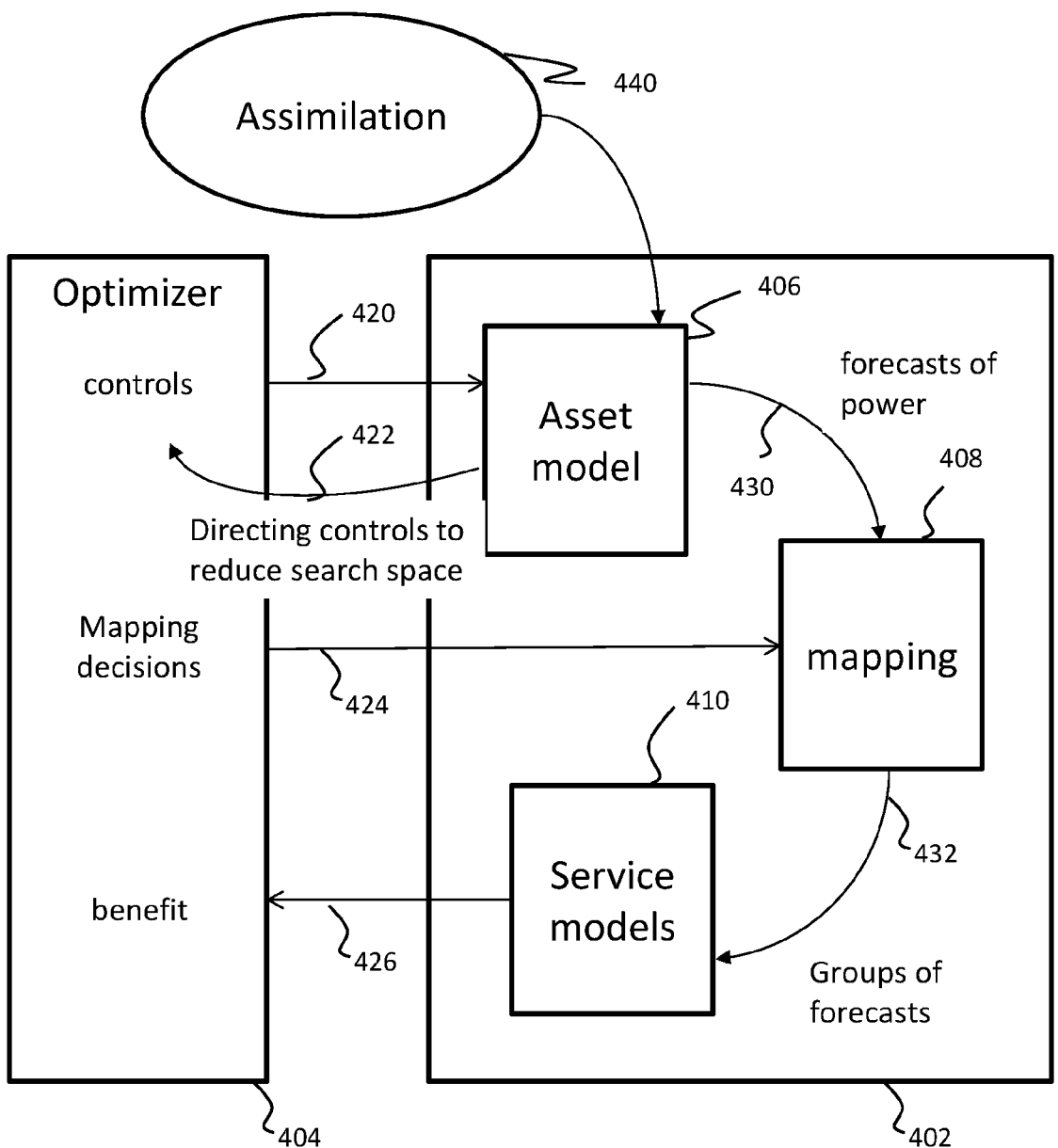
FIG. 4 illustrated software modules in a server implementing some of the methods described.

Referring to FIG. 4, details of certain computation modules on the server 25 are shown. There is a modelling and mapping function 402 and an optimizing function 404. The modelling and mapping function 402 comprises three sub-functions: asset models 406, mapping function 408 and service models 410. There is an assimilation function 440 for initiating the asset models 406.

Referring first to the asset models 406, each asset has a corresponding model (as described with reference to FIG. 3) and is in physical communication with this asset (through a router at the asset). Each asset has local parameters within which it must operate (limits of temperature etc.) and these can be stored in the models for the assets and/or each asset has time behaviours (for how long it remains ON or OFF for a period of time, dead times when it must remain ON after turning ON or OFF after turning OFF) that can be stored in the model. Because the model is in continuous or periodic communication with its asset, it "knows" whether the asset has reached a local limit (or can still respond before reaching that limit) and it "knows" whether the asset can be turned ON or OFF in the immediately following period given the recent actions of the asset.

The asset can perform a function such as turning ON or OFF. It can be requested to do so by the server 25 or it can do so in response to a conditional command from the server (e.g. conditional upon locally measured line voltage and/or frequency or other grid measurements). The request is passed from the energy router to the asset's local controller. If it can do so (upon receipt or when the condition occurs), the local controller executes the request. If it cannot, for example because to do so would exceed the boundary conditions of the local control loop, it does not. When the asset responds (if it responds), its operation from the point of view of the grid is to either draw power or return power to the grid. In other words, it can be modelled as a battery with certain parameters such as:

charge capacity internal resistance, or rate of change of energy absorption/rate of energy delivery Modelling each asset in this manner from the perspective of its behaviour in the grid in response to a command allows for a uniformity which lends itself to simplification of the other processes to be described.

The mapping function maps assets to their ability to serve service models, e.g. by geography or topology or for other reasons. E.g. an asset in the east of England would not be mapped to a short-term service model in the southwest. Similarly an asset connected to one substation would not be mapped in a configuration that requires it to deliver power to another substation connected only by a transmission line (because surplus power must be used at a local or intermediate level and cannot be fed up to a transmission line). The topology of the grid and its substations is stored in the mapping 408 so that impossible combinations of assets can be ruled out. Also stored in the mapping are combinations that will work for one service model but not for another.

Service models are stored in module 410 together with weighting factors to normalize the benefit of fulfilling each service model to a common scale.

In basic operation, an asset model is generated for each asset over the coming 24-hour (or other) cycle. Each model may have many forecasts of power requirements of that model. Preferably each model generates a probability distribution for the range of possible forecasts. The set of forecasts for the set of assets (and, where used, their respective probability distributions) are outputs 430 of the asset model module 406.

Many asset models are mapped in mapping module 408 to many service models for which those assets are theoretically available at present and for the forthcoming cycle. Thus, the output of mapping module 408 is many groups of forecasts corresponding to many possible mappings.

The service models module 410 calculates, according to weightings assigned to different service models, the respective benefits of fulfilling the respective service models for which groups of assets may be assigned. These benefits form outputs 426.

The respective benefits of assigning assets to service models are all inputs 426 to the optimizer 404. There are many such combinations and therefore many such inputs. The task of the optimizer 404 is therefore to perform a multi-dimensional optimization (optimizing to a common normalized parameter indicative of "benefit" or "value").

The preferred manner by which the optimizer 404 operates is by performing a path search. I.e. it calculates benefit for many combinations of assets, asset groups and service models and seeks the optimal path that identifies the combination of assets and service models that maximizes the benefit parameter.

It is the task of the optimizer to find that combination, and to assign those assets to those service models for the forthcoming period (e.g. 30 minutes). It determines what is the best allocation of assets now (at time T0) to give the maximum benefit over the next cycle (e.g. 24 hours). It may be noted that a "cycle" preferably comprises a fixed integer number of "periods".

Assigning an asset to a service model may be manifested physically in a number of ways. It may, for example, mean that a command is sent to that asset to behave in a certain way, e.g. to be responsive to local grid measurements, or to allow its local control loop to depart from a normal hysteresis loop but remain within wider critical parameters. Alternatively, it may mean that subsequent commands are sent to that asset in the course of the following period to cause that asset to comply with the service model rather than with its local control loop. E.g. "ON" and "OFF commands are sent to that asset (and other assets in the same group) so that over the course of the period, the service model is fulfilled.

The server 25 monitors what service models are selected for fulfilment over the coming period and whether they have successfully been fulfilled. It generates a report to the grid operator showing the service models and the individual benefits gained.

Considering now the case where there are over 500 assets that are modelled in asset model 406 (e.g. 500 to 10,000 assets). There are potentially a vast number of ways of grouping these assets in mapping function 408, leading to an almost unmanageable number of possible benefits to be calculated by module 410.

One preferred way in which the field of search for the optimum combination is reduced is through mapping decisions 424 from the optimizer 404 to the mapping function 408. In this feedback, the optimizer 404 eliminates mappings that are unlikely to be suitable for a particular service model. E.g. it may eliminate mappings based on (i) geographic/topological position, (ii) asset type and (iii) service model. E.g. a service model requiring frequency response may require assets of a responsive type that are geographically dispersed. By contrast, a service model that requires a local service would be mapped to local assets.

Another reduction in mapping would be to eliminate mappings of assets to service models that work against each other.

More generally, the optimizer 404 may control the modelling and mapping functions 402 to change or refine the asset models or the mappings to search for a more optimal result. One way in which this may be done is through the application of heuristics, i.e. predetermined rules that may be stored and updated from time to time.

An example of a heuristic rule is an initial search rule to find an initial "best guess" at an optimal solution, for example by first allocating the largest assets to service models that are most likely to suit those assets (e.g. based on the response time profile of the assets) and then continuing to allocate the next largest assets in the same manner and continuing in a "best fit" algorithm. In a heuristic approach such as this, the sum benefit of each allocation is calculated at each step. A step is reversed if an allocation results in a reduction in the overall sum and a different path is explored (a different asset-to-service model allocation), until all the assets are assigned to service models or until all service models are fulfilled.

Heuristic rules may, for example, relate to preferred asset models and preferred mappings of models to service models, that in each case have a higher probability of delivering a service of the type that matches a given service model, e.g. based on the time response profile of the asset and the time response profile of the service model or based on accumulated past experience.

One specific way in which past experience can be used is by "seeding" the optimizer with a solution (based on an initial search rule or based on the previous solution) and then searching for optimal solutions around that solution. For example, it may be a good guess that the optimal allocation of assets for the next 24 hours is similar to the allocation of assets calculated 30 minutes ago (or, for example, the allocation of assets calculated at the same time the previous day). This can be a starting point for a search. The optimiser 404 can provide this solution as a control input 420 and a series of other solutions centred around that solution, e.g. using heuristic or stochastic variations on that solution (or a combination thereof).

An example of a heuristic variation would be replacement of a selected asset (or a self-selecting asset—i.e. one that is no longer available). For example a certain asset could be replaced where it had been called upon in the last period (in this example, the last 30 minutes) to perform a certain action and as a result is incapable of performing the action required of it for the purpose of a service model to which it is mapped (or has a probability of performing that action that has fallen below a threshold). Solutions would be explored that replace that asset with one or more alternative assets.

Another example of a heuristic is a "greedy search" which converges on the first peak encountered from the starting conditions.

A replaced asset, having been replaced in its previously assigned group, may not be free to be re-assigned to a similar service model, but is free to be re-assigned to a different group (a previously formed group) previously mapped to an orthogonal service model or to a group to be newly formed.

Another example of a heuristic variation would be attempted formation of a new group to be mapped to a previously unfulfilled service model, e.g. a service model that is next in a priority order or is next in a size order (e.g. a service model requiring relatively small capacity).

Stochastic variations on a solution can be explored, each varying from a given solution in at least one and preferably several dimensions. An example of a dimension is the number of assets assigned to a group. Another example of a dimension is the particular specific assets assigned (some of which may have a greater or lesser propensity—i.e. probability—to respond to a request to perform an action). More generally, a "dimension" is a variable in the optimizer that can be adjusted in search of a maximum sum of benefit across service models and is orthogonal to other variables that can also be adjusted in search of the maximum sum.

By way of example of stochastic variations, solutions can be explored that have small variations in a given dimension on the previous mappings. E.g. where a group of 10 or 20 assets have been previously assembled into a string to serve a particular service model, other solutions can be explored that replace, say 10 or 20% of the assets in the group with alternative assets that together have the capacity to deliver the same or a similar result. E.g. a string that forms a 1 MW responsive load can be altered in its composition by using different assets that still sum to a total of about 1 MW. Another example of a small variation is a slight expansion in the capacity of a group of assets (slight nominal over-capacity of a group of assets to deliver a service model) or a slight reduction in capacity (reducing over-capacity so that the nominal capacity of the group is closer to the required capacity for the service model while still meeting or exceeding the required capacity).

The optimizer can operate iteratively by calculating an optimal allocation of assets to service models and then adjusting the mappings or other parameters (heuristically or stochastically or heuristically followed by stochastically) to try an alternative combination.

A heuristic approach to optimization is quick and delivers quite good results when there is a good supply of available assets to fulfil a limited number of service models. A combination of a heuristic approach followed by a stochastic approach (e.g. a simulated annealing approach) is found to make small but valuable improvements in the sum benefit when there is not a good surplus of assets or when there are more service models than can be fulfilled by the available assets, i.e. there are additional service models (or a surplus of service models from time to time) that may be fulfilled if more variations can be explored. Such an approach is also useful for devising new orthogonal service models and exploring their potential for fulfilment.

Figure 5:
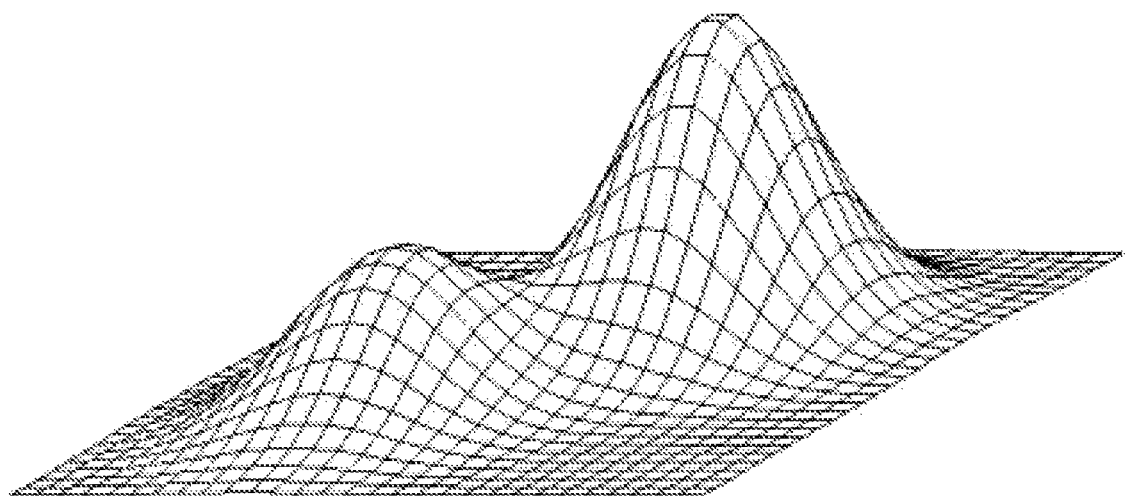
FIG. 5 illustrates a multi-dimensional search for a global maximum.

With each iteration, new controls 422 can be imposed by the asset models 406 on the optimizer 404 to reduce the possible search space To illustrate the operation of the optimizer, FIG. 5 shows a simple 2-dimensional search space with two local maxima, only one of which is a global maximum. The task of the optimizer is to find the global maximum. It is not enough to start at any point and iteratively work towards a peak. An algorithm is required that will not simply converge on the nearest peak. What is needed is an algorithm that will explore the search space in a reasonable number of steps and identify the global maximum. There may be many dimensions to search and many local maxima. A combination of a heuristic approach and a stochastic approach is found to be highly satisfactory. The initial heuristic approach may be a simple coarse scan across all the parameters in all the dimensions or it may adopt one of the above approaches. Once a candidate maximum or several candidate maxima is/are found, a stochastic approach can be used to explore around each maximum, working closer to each maximum and eliminating maxima that are found to be lower than other candidate maxima, until the global maximum is found.

Figure 6:
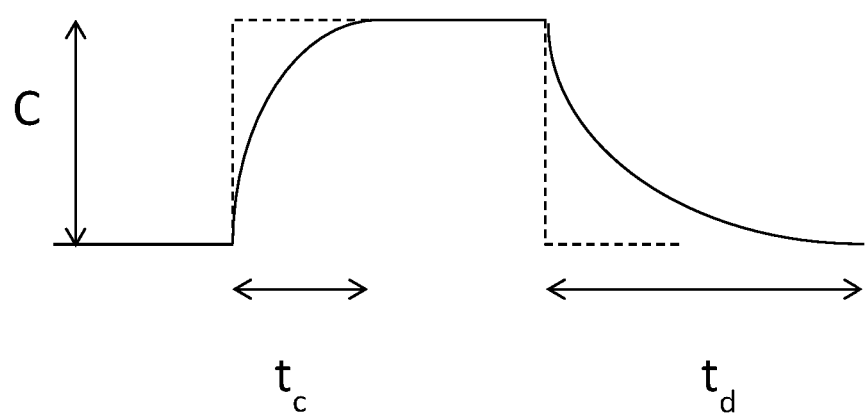
FIG. 6 is a time diagram illustrating a standardized asset model.

Referring to FIG. 6, an example of an asset model is shown. Each asset is modelled as a battery or store and has a set of standardized parameters. By way of example, it may have a charge capacity C, a charge time constant $t_c$ and a discharge time constant $t_d$. (These may be measured in various ways such as the time to charge to 95% of full charge and the time to discharge 95% of the stored charge).

Instead of or as well as modelling the time envelope to reaching a certain level of charge, it is possible to model the time envelope to delivering or absorbing a certain level of power.

In the case of some assets (such as a responsive load), $t_c$ represents the time it will take that asset to absorb a predetermined amount of energy (C) when required to do so by a command from the server, and $t_c$ represents the time it will take to recover (when left alone by the server) to a position at which it can once again absorb the predetermined amount of energy. In the case of a load, $t_c$ is typically shorter than $t_d$.

In other cases (such as a store) both the charge and discharge actions are modelled as responsive actions that can occur under the control of the server. In the case of a battery, $t_c$ is typically longer than $t_d$.

In other cases (such as a source), the discharge side of the cycle is modelled with time constant $t_d$ and the model does not have a charge cycle (because the source can deliver charge to the grid but cannot absorb it).

This common asset model simplifies the task of grouping assets and forecasting the behaviour of a group of assets.

Assets may be categorized by their models. E.g. there may be assets with short and long charge times and there may be assets with short and long discharge times. A battery may be categorized as a source having a very short discharge time. A gas turbine may be categorized as a source having a medium discharge time, and a coal-fired generator may be categorized as a source having a long discharge time. (Note that these latter sources do not have a limited capacity and can continue to generate, but what is of interest in the model is the time between receiving a command to respond and ramping up discharge to a given level of charge delivered or a given level of power being delivered).

The process of assimilation 440 in FIG. 4 will now be described. In this process, an asset is connected to the grid 50 and its details are stored in database 43 in terms of its position in the grid and certain parameters within which the server 25 is permitted to influence its operation (but outside which it must usually be free to control itself).

There may be extraordinary circumstances in which a particular service model is permitted to cause the asset to stray to extraordinary levels. E.g. there may be a service model that is intended to prevent damage to grid equipment and it might, in extraordinary circumstances, be permitted to allow a refrigeration plant to warm up or cool down to the point of damaging its contents. In such a service model, modelling function 410 would have to weigh up the value of the service model (e.g. not damaging grid equipment) against the cost of providing the service (e.g. ruining the refrigerator contents).

Setting aside extraordinary circumstances and focussing on normal operation, the assimilation process 440 is now in a position to test the new equipment and to model its operation. The server 25 issues a command to the new equipment (e.g. to turn ON or turn OFF). Metrology sensors at the asset measure physical parameters (e.g. power, temperature etc.) at the asset and report these to the server. The server looks at how the asset responded to the command over time. It determines the value C for the asset (how much charge or power was absorbed or released) and the charge and/or discharge time constants. It repeats the test at different delays up to a full cycle (e.g. a 24 hour period) to see what is the recovery time of the asset (i.e. how long the server must wait until the asset is in a position to repeat the action).

E.g., having performed a first test and ascertained whether the asset responded, a second test can be performed after a selected delay. The selected delay may be as short as one period of 30 minutes (if there is sufficient time within that period to receive a report from the asset following the first test), or it may be after two, three or a number of periods. If, having first responded, the asset fails to respond again after a first delay, this indicates that the recovery time of the asset is greater than the selected delay. Third and further tests can be performed after longer selected delays until a delay is selected after which the asset responds. This indicates that the asset has recovered from the first test. The nominal recovery time for that asset corresponds to the shortest delay after which a further test delivers a response.

A full test can be repeated with different delays (e.g. on a subsequent day) to give another measure of the recovery time for the asset. The recovery time for the asset can be expressed as an average of the various measurements or as a distribution of the measurements.

The assimilation process 440 may repeat this test operation several times to ensure that the effects measures are indeed as a result of the command issued. It also determines a probability for the asset—i.e. the probability that it will respond to a command from the server. This can be a probability distribution over time or across some other dimension. E.g. repeating the process at different half-hour times across a number of days can give a probability distribution across time-of-day. Similarly, in the case of a thermal load, probability of responding at different values of temperature (as reported by the asset through its router to the server) can give a probability distribution with temperature. A probability distribution for an asset may have several dimensions (time, temperature, etc.). When the assimilation process is complete, a model for the new asset is saved in modelling function 406.

The model for an asset can be updated from time to time during use, e.g. to provide more accurate time constant and charge parameters and to update the probability value or distribution(s).

An asset's off-time typically follows an expected pattern with a distribution, but overall it is uncertain in time. If an asset comes ON early or finishes late, it will impact the ability to deliver a service. There is typically a degree of uncertainty in how the assets might behave.

In a preferred aspect of implementation, these individual uncertainties for individual assets are stacked up to give some overall uncertainty for a candidate set of assets that may be selected to deliver a service. Not only can a power level be optimised but also the probability of delivering the service. In other words, a set of assets can be selected to deliver a selected service to a desired level of probability (e.g. 95%). By using the overall uncertainty for each candidate set of assets, there will be occasions when a smaller candidate set can be selected to deliver the service with the desired probability, whereas a larger set might be required based on individual uncertainties for individual assets. Where a smaller set of assets can be selected, this frees up assets to be allocated to fulfil other services.

Whereas stacking of individual uncertainties to give an overall uncertainty adds to the mathematical complexity (due to the irregular distribution, complex interactions, probability of state changes during two discrete state), there are established schemes for achieving this, particularly Monte Carlo Markov Chain based statistics.

Accordingly, a power control system is provided in which the server maintains asset models that represent asset behaviour, each asset model being in real-time communication with its asset to dynamically inform the model of the status of the asset, wherein each asset model has a distribution of probable behaviour for its asset. The server maintains at least one service model for a desired service and has mappings that map to the service model assets that have a possibility of fulfilling the service. An optimizer searches for combinations of assets to fulfil the service by stacking the distributions of asset behaviours of a group of assets to determine an overall probability of combined asset behaviour. It selects assets to fulfil the service based on the overall probability for the group. Having selected assets to participate in the service, the server issues instructions to those assets to influence their behaviour over a set period. The set period is preferably the immediately following 30 minutes, but could be shorter or longer.

In selecting assets to fulfil the service based on the overall probability for the group, the optimizer selects the assets that will, to a set probability, fulfil that service. For example, if the set probability is 95%, this means that the service is almost certain to be delivered. To achieve such a high level of certainty may require more assets to be assigned to that service. By setting the probability lower, e.g. 80%, fewer assets may need to be grouped. The stacked probability distributions of a larger number of assets will give a higher overall probability of delivering the service, while the stacked probabilities of a smaller number of assets with deliver the service to a lower probability. In the former case, more assets are "tied up" in delivering that service (and are free only to deliver other services that are orthogonal). In the latter case, more assets are free to be allocated to other services.

Preferably the set probability of delivery of a service is an input parameter that can be set by an operator at the management user interface 41.

Preferably the probability distribution for each asset model is updated in real time by communication with the asset. It is updated by determining whether, in a preceding period, the asset responded or did not respond to a command from the server. This determination is made many times over many periods to establish the probability distribution.

The probability distribution for an asset may have several dimensions, each dimension being a parameter for that asset. For example a parameter for an asset may be its temperature. The probability of turning ON or OFF can be modelled as a distribution across this parameter. Other example parameters are the time since last turn OFF or last turn ON.

Figure 7:
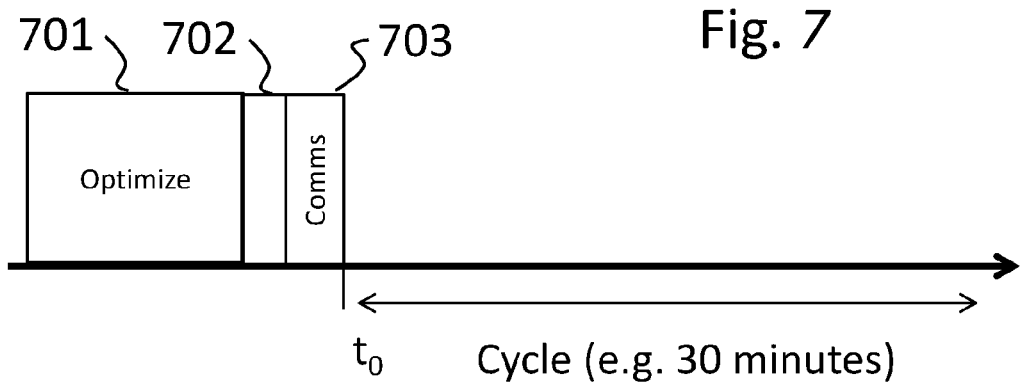
FIG. 7 is a timeline showing the operation of the components of FIG. 4.

Referring to FIG. 7, a timeline of operation is illustrated. There is an optimizing time 701 when the optimiser performs its function, followed by some processing time 702 when the optimal solution is converted into instructions for specific assets and a communications time 703 when those instructions are communicated to the respective assets. At time $t_0$ the assets have received their instructions and begin a cycle of operation (e.g. operate according to those instructions for the next 30 minutes).

Ideally, the optimizer is predicting what will be the optimum disposition of assets at time $t_0$. I.e. the data it uses to perform its function is data predicted at a future time— viz, time $t_0$ when the optimal solution is to be deployed.

If, between the beginning of the optimization process and time $t_0$, something fundamental has changed so that the optimal solution is no longer correct (e.g. no longer viable because of a change of state of one of the assets involved), there are a number of choices beyond merely ignoring the change and deploying the solution. For example, the status quo can be maintained while the optimizer is run again. Alternatively, a sub-optimal solution may have been identified and stored in the course of optimization, where the suboptimal solution is unaffected by the change (e.g. is still viable) in which case this can be deployed as the solution.

Figure 8:
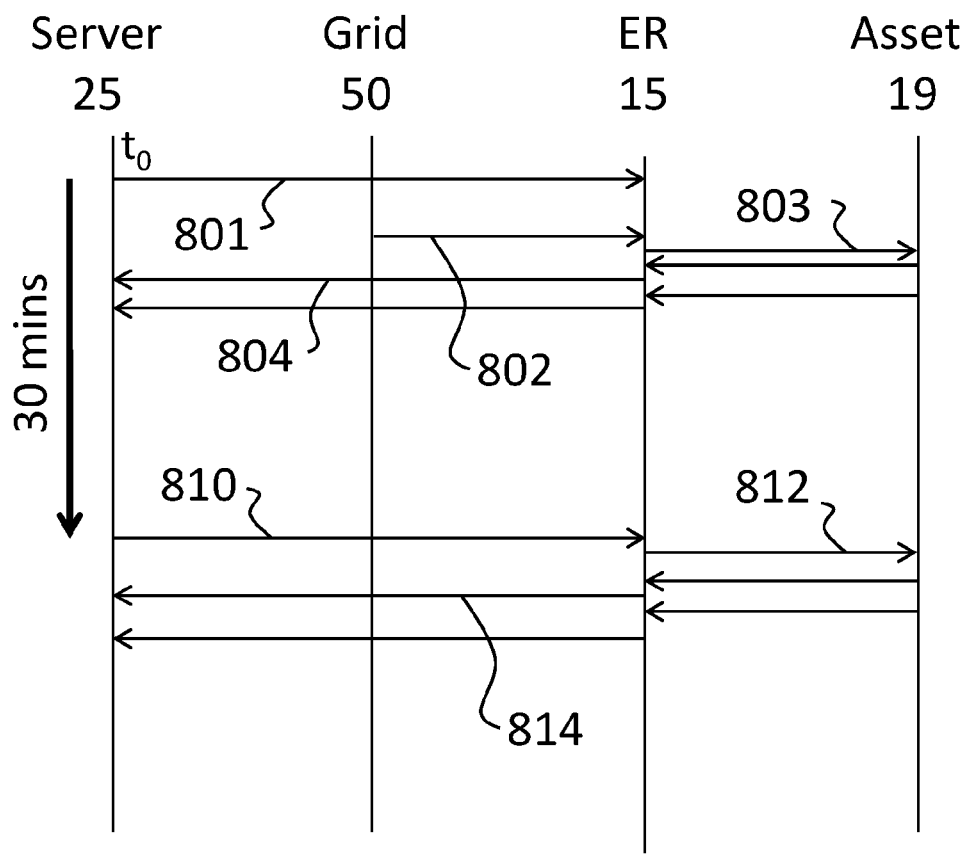
FIG. 8 is a message flow diagram illustrating examples of communication between an asset model and its asset.

As has been described, the server 25 maintains an asset model for each asset. Referring to FIG. 8, further details of the communications between the asset model and its asset will be described with reference (by way of example only) to asset 19 (which is a load).

At time $t_0$, the energy router 15 for the asset 19 receives its instruction from the server. In this example, the instruction is a conditional command—i.e. one that can be triggered by an event in the grid 50 as measured by the metrology unit at the router 15. The command is received together with parameters that define the triggering event and parameters that define the action to be taken. For example, the triggering event may be a fall in grid frequency of x % (e.g. 2% or 1 Hz) or a fall in grid voltage of y % (e.g. 2% or 5 volts). The action to be taken may simply be "turn OFF". Other assets may have other actions that can contribute to rectifying a fall in grid frequency and/or grid voltage (e.g. in the case of a store, it can discharge into the grid).

If the triggering event occurs in the grid, this is measured by the router, as represented by arrow 802. In response, the asset may or may not perform the action. Whether it does so may depend on its own local control loop. If, for example, the asset is a refrigeration unit that is cooled well below is upper temperature limit, it can safely switch OFF. It will in due course switch ON again under its own control loop. Other thermal assets behave in a similar way.

The router 15 reports to the server 25 a new status for the asset. This is done by message 804. Note that message 804 is not necessarily a report of an action taken (or not taken). It may be a mere status report, in which case it is left to the asset model at the server 25 to compare the reported status with the previously known status to determine if the desired action has been taken. Status messages 804 may be reported at regular and frequent intervals (e.g. every minute or every few minutes or several per minute).

After a period of 30 minutes (or other period), the process is repeated. In the illustrated example, a new message 810 is sent which is an unconditional message—i.e. not dependent on any event in the grid. This is not to say it is a command that must be acted upon. It is (as before) conditional on the local control loop of the asset being in a position to perform the requested action. The message could be a request to change status or a request to not change status (maintain a present status). In the illustrated example, the message causes the router 15 to intervene at 812 in the local control loop of the asset 19. The router monitors the status of the asset and reports at 814 the status to the server 25.

There is a standard internet communications protocol between the server and each router. The communication between the router and its asset is a local bus that can take many forms and is in real time. There may be unlimited opportunities for the router to monitor its asset, while the occasions when the router reports to the server are defined in the system. They may be set in the router or polled at intervals determined by the server.

A biomass generator is an example of an asset that can provide different responses for different services, e.g., planned and triggered services. Biomass-fired plants, e.g., biomass-fired CHPs, are controllable and not dependent on weather conditions. Their output is predictable and continuous. Thus biomass plants can be used as a spinning reserve to increase electrical output when demand is high or to support intermittent renewable sources and operated for heat-only output when demand is low. Moreover a biomass plant can be switched off to give a quick intervention for a limited amount of time based on required power services.

Figure 9:
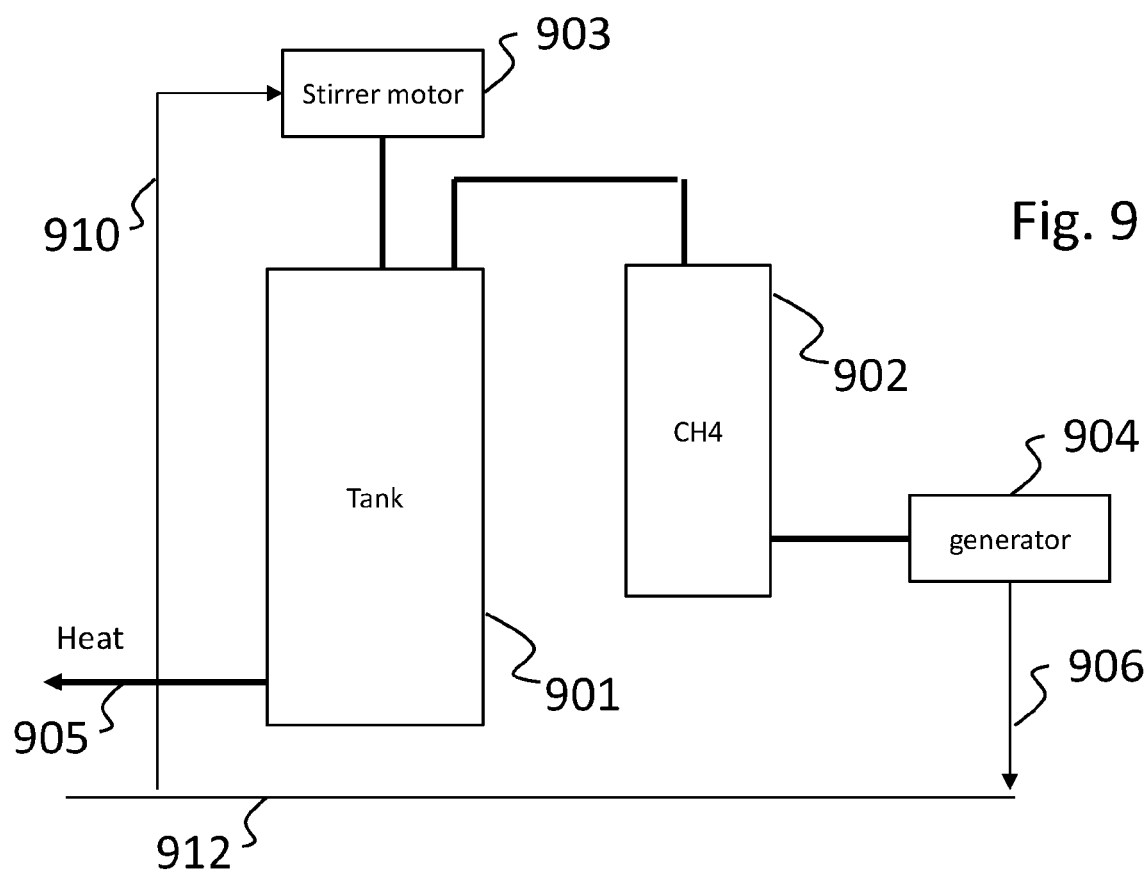
FIG. 9 is an example of a biomass generator.

Referring to FIG. 9, a biomass generator is illustrated, for example as described in U.S. Pat. No. 8,017,366. It comprises a biomass tank 901, a methane tank 902, a stirrer motor 903, a generator 904, and a heat output 905. It has an electrical output 906 and an electrical input 910 connected to a grid 912.

In operation, biomass material in the tank 901 digests anaerobically and generates heat at the heat output 905 and (as required) electricity at the electrical output 906. From time to time, the tanks are stirred by stirrer motor 903. When this happens, the system is a net load on the grid 912. Stirring the tanks (and performing other operations) changes the balance between heat generation and methane generation (which in turn affects electricity generation).

The biomass generator can be modelled as a combined heat and power unit in combination with a responsive load. Sometimes it operates as a power unit (i.e. a source that generates electricity) and at other times it operates as a load (when the tanks are stirred). Other biomass plants operate in other ways (e.g. burning woodchip material) and from time to time require electrical input to operate mechanical machinery.

There is flexibility in when a biomass plant operates in its different modes. The server 25 can have a high degree of influence on these modes, for example, calling upon the mechanical machinery to operate (e.g. the motor to stir the tanks) when there is an excess of energy in the grid 912 or calling upon the generator 904 to generate electricity when there is a deficit.

Thus, various aspects of a system have been described, including mixing and matching a portfolio of different types of assets with different characteristics which are complementary and work cooperatively together to achieve a new and unique power service. For example, multiple low power assets which have limited use may be backup to an expensive highly utilised, high power asset to provide redundancy. Or high frequency response assets (fast but limited capacity) can be combined with slower high capacity assets to provide a fast response, high power generator. This allows the exploitation of flexibility in cheap demand assets. e.g., fridge, energy is fed in the fridge when it is warming up and so demand asset behaves like energy storage.

An asset does not only deliver services when a trigger occurs. It can also wait for a while to help with the collaboration and combine together the effort of multiple assets to deliver the service jointly. One example is cold storage. A point can be found to turn off in order to gain flexibility to respond to a trigger with the benefit of time shifting some energy usage.

Assets are usually either designed to react to a trigger or deliver power at a planned time. These concepts are combined to give power at planned times while maintaining flexibility to react on trigger.

Flexibility is the system's ability to respond to a trigger immediately and change the instantaneous power provided. Optimising for flexibility is to have the ability to deal with services faster than the current ability of an optimiser to assimilate. This is achieved by putting the asset portfolio in the best possible position to be ready for triggered service. Some assets are mapped to one or more planned services and some are mapped to one or more triggered services. These assets may overlap as described above.

Triad avoidance action can be undertaken on behalf of an asset owner. Triad prediction is available and this is used that as an input to server 25. The action is automatic but the system also allows precondition of assets to best avoid triads. Prediction (1 day ahead) with a probability of accuracy is a valuable feature and together with knowledge of assets characteristics gives improved performance in the event of a triad.

Although the optimiser can see all assets available to the system, it may be advantageous to compartmentalise. The complexity of the optimisation problem goes up as a polynomial of the number of assets and mappings. However, mappings create islands, i.e., assets with interactions. By separating the different islands which do not have interaction among them, optimisation is simplified. Islands can be optimised separately and then recombined to provide the solution. For stochastic optimization, it is important to have a good starting point. The optimizer search can be pre-seeded to reduce complexity, e.g., using a deterministic routine to derive a good starting point for an island.

A power control system has been described having a server that maintains asset models that represent asset behaviour, each asset model being in real-time communication with its asset to dynamically inform the model of the status of the asset; means at the server for performing a test by issuing a command to an asset requesting the asset to perform a function; sensors at the asset to measure physical parameters at the asset and report these to the server; means at the server for determining whether the asset responded to the command and, if the asset responded, how it responded over time; and means at the server for establishing or updating a model for the asset in terms of at least an energy capacitance and a time constant based on the measured response.

The server can repeat the test at different delays and establishes a recovery time for the asset. Each model for a load or store may model a charge envelope for a load or store and/or a discharge envelope for a store or source. The server may repeat a test to determine a probability that the asset will respond to a given command from the server.

A power control system has been described in which a server maintains asset models that represent asset behaviour, each asset model being in real-time communication with its asset to dynamically inform the model of the status of the asset, wherein each asset model has a distribution of probable behaviour for its asset; server means for maintaining at least one service model for a desired service and mappings that map to the service model assets that have a possibility of fulfilling the service; optimizer means for searching for combinations of assets to fulfil the service by stacking the distributions of asset behaviours of a group of assets to determine an overall probability of combined asset behaviour and for selecting assets to fulfil the service based on the overall probability for the group.

The system may further comprising means for communicating instructions to the selected assets to participate in the service to influence their behaviour over a set period. The set period may be the immediately following 30 or 60 minutes.

The system may further comprise means for setting a probability of delivery of a service as an input parameter to the system.

A method of controlling a power distribution system has also been described comprising: maintaining asset models that represent power asset behaviours, each asset model being in real-time communication with its asset to dynamically inform the model of the status of the asset, wherein each asset model has a distribution of probable behaviour for its asset; maintaining at least one service model for a desired service and mappings that map to the service model assets that have a possibility of fulfilling the service; searching for optimal combinations of assets to fulfil the service by stacking the distributions of asset behaviours of a group of assets to determine an overall probability of combined asset behaviour; selecting assets to fulfil the service based on the overall probability for the group; and communicating instructions to the selected assets to participate in the service to influence their behaviour over a set period.

The selecting of assets preferably comprises selecting assets that will, to a set probability, fulfil that service, but it may comprise selecting more assets than the minimum possible to deliver the service.

The method preferably further comprising updating, in real time, the probability distribution for each asset model by communication with the respective asset.

The method preferably comprises determining whether, in a preceding period, the asset responded or did not respond to a command from the server. Such a determination may be made many times over many periods to establish the probability distribution.

A power control system has also been described for controlling a set of power assets connected to a grid, in which each power asset has a local controller for controlling the asset under a local control loop and is capable of receiving instruction from a server to influence its operation in accordance with a secondary process controlled by the server. The server maintains: (i) asset models that represent asset behaviour, each asset model being in real-time communication with its asset to dynamically inform the model of the status of the asset; (ii) multiple service models that represent secondary processes that involve different power assets; and (iii) mappings that map assets to service models that can be fulfilled by those assets. An optimizer determines which assets are to participate in which service models.

There may be a plurality of service models, at least some of which involve multiple assets and wherein a given asset can participate simultaneously in more than one service model. At least some of the service models have orthogonal objectives. Two objectives are orthogonal if an asset, having been allocated to both service models, can simultaneously contribute to both objectives without compromising either objective. The orthogonal objectives include: time shifting demand for power; making assets available to be responsive to changes in voltage or frequency; and extending asset or grid equipment lifetime or reducing power wasted through heat loss.

The optimizer preferably models the operation of all service models over a common time into the future. It models the operation of each asset over time and the future operation of the asset in time and other dimensions and preferably performs a path search optimization algorithm to find an optimal path for allocating assets to service models to maximize benefits across all service models. On each optimization path search run, it models the operation of all service models over 24 hours into the future. Paths are eliminated that include assets that are unable to participate in a given service model on account of their status. The optimizer re-runs its optimization after each expiry of a predetermined time period (15 minutes, 30 minutes, 1 hour or a number of hours up to 24 hours). Upon each re-run, the optimizer may use the previous result to guide the path search or it may begin its search from a heuristically determined start point. It may maintain a set of heuristic constraints to limit the path search. The heuristic constraints may include indications of which assets are more suitable or less suitable for participating in respective service models.

A method of controlling a set of power assets has been described, comprising: maintaining, at the server, asset models that represent asset behaviour, each asset model being in real-time communication with its asset to dynamically inform the model of the status of the asset; maintaining multiple service models that represent services that involve different power assets, and mappings of assets to service models for services that can be at least partly fulfilled by those assets; determining an optimum disposition of assets, including selecting assets to fulfil services modelled by the service models; and communicating to the selected assets instructions to attempt to fulfil the services.

Each service is to be provided over a set period starting from receipt of the instructions by the assets and the instructions are valid for the set period. The step of determining an optimum disposition preferably comprises performing a search across possible dispositions for a cycle that is many times longer than the set period. The step of optimizing may include predicting, by the asset models, the statuses of the assets at a future time after conclusion of the optimization and/or communication to the selected assets.

The above description of embodiments and examples is given by way of example only. Various aspects and embodiments of the invention can be combined. Various aspects and embodiments can be modified in accordance with other aspects and embodiments. The scope of the invention is not to be limited by details of the embodiments, but is defined in the appended claims.

The invention claimed is:

1. A power control system, comprising:
a server; and
a plurality of power assets connected to a power grid, each asset having sensors to measure real-time physical parameters at the asset and report these to the server, wherein
the server is configured to:
maintain asset models that represent behaviour of the power assets, each asset model being in real-time communication with a corresponding one of the power assets to dynamically inform the model of a status of the corresponding power asset;
perform a test by issuing a command to a power asset requesting the asset to perform a primary function;
determine, from the parameters reported by the asset, whether the asset responded to the command and, if the asset responded, how it responded over time in terms of how much power the asset absorbed from the grid or released to the grid and over what time, as a direct consequence of the command; and
establish and update a model for the asset in terms of at least an energy storage capacitance, a time constant based on the measured response, and a recovery time after which the asset has recovered from the test, whereby the server can determine whether the asset can be allocated at a future time to provision a secondary function to the benefit of the grid beyond the primary function of the asset, the primary function being a local operation of the asset and the secondary function is a grid-level operation.

2. The system of claim 1, wherein the command is a command to turn ON if OFF or a command to turn OFF if ON.

3. The system of claim 1, wherein the server repeats the test at different delays and establishes a recovery time for the asset.

4. The system of claim 1, wherein each model for a load or store models a charge envelope for the load or store.

5. The system of claim 1, wherein each model for a store or source models a discharge envelope for the store or source.

6. The system of claim 1, wherein the server repeats a test to determine a probability that the asset will respond to a given command from the server.

7. A method of controlling a system of power assets connected to a power grid, comprising:

performing a test by issuing a command to a selected power asset requesting the asset to perform a primary function;
determining, based on real-time physical parameters measured at the selected asset, whether the asset responded to the command and, if the asset responded, how it responded over time in terms of how much power the asset absorbed from the grid or released to the grid and over what time, as a direct consequence of the command;
establishing and updating a model for the selected asset in terms of at least an energy storage capacitance, a time constant based on the measured response, and a recovery time after which the asset has recovered from the test, whereby a server can determine whether the asset can be allocated at a future time to provision a secondary function to the benefit of the grid beyond the primary function of the asset, the primary function being a local operation of the asset and the secondary function is a grid-level operation; and
issuing future commands to selected power assets, from among the power assets, that can be allocated to provision of the primary function based on the models so established.

8. The method of claim 7, wherein the command is a command to turn ON if OFF or a command to turn OFF if ON.

9. The method of claim 7, comprising repeating the test at different delays and establishing a recovery time for the asset.

10. The method of claim 7, comprising repeating the test to determine a probability that the asset will respond to the command from the server.

11. A power control system for controlling a set of power assets connected to a grid, comprising:
the set of power assets, each power asset having a local controller for controlling the asset under a local control loop in accordance with a primary function of the asset and adapted to receive instruction from a server to influence its operation in accordance with a service model process controlled by the server, wherein a given service model process is a grid level process that is modelled and controlled by the server and is secondary to the primary function of any power asset participating in that process, the primary function being a local operation of the asset, wherein the server maintains:
asset models that represent power asset behaviour, modelling each power asset in terms of at least an energy storage capacitance, each asset model being in real-time communication with its power asset to dynamically inform the model of a status of the power asset, each model including a recovery time for its power asset, being a delay after which the power asset will be in a position at which it can, having once received instruction in accordance with a grid process to absorb power from the grid or release power to the grid, respond again to such a grid instruction by again absorbing or releasing power respectively;
multiple grid service models, each representing a grid level process that can involve different power assets;
mappings that map power assets to grid service models that can be fulfilled by those power assets;
an optimizer to determine an optimum selection of power assets to fulfill grid level processes modelled by the grid service models; and a server-to-asset-connection for communicating to the selected power assets instructions to attempt to fulfill the grid level processes.

12. The system of claim 11, wherein there is a plurality of grid service models, at least some of which involve multiple assets and wherein a given asset can participate simultaneously in more than one grid service model.

13. The system of claim 12, wherein at least some of the grid service models have orthogonal objectives, where two objectives are orthogonal if an asset, having been allocated to both grid service models, can simultaneously contribute to both objectives without compromising either objective.

14. The system of claim 13, wherein the orthogonal objectives include:
   time shifting demand for power;
   making assets available to be responsive to changes in voltage or frequency; and
   extending asset or grid equipment lifetime or reducing power wasted through heat loss.

15. The system of claim 11, wherein the optimizer models the operation of all grid service models over a common time into the future.

16. The system of claim 11, wherein the optimizer models the operation of each power asset over time and the future operation of the power asset in time and other dimensions and performs a path search optimization algorithm to find an optimal path for allocating power assets to grid service models to maximize benefits across all grid service models.

17. The system of claim 16, wherein on each optimization path search run, the optimizer models the operation of all grid service models over 24 hours into the future.

18. The system of claim 16, wherein paths are eliminated that include assets that are unable to participate in a given grid service model on account of their statuses.

19. The system of claim 16, wherein the optimizer re-runs its optimization after each expiry of a predetermined time period.

20. A method of controlling a set of power assets connected to a grid, the method comprising:
   maintaining, at a server, asset models that represent power asset behaviour, modelling each power asset in terms of at least an energy storage capacitance, each asset model being in real-time communication with its power asset to dynamically inform the model of a status of the power asset, each model including a recovery time for its power asset, being a delay after which the power asset will be in a position at which it can, having once received instruction in accordance with a grid process to absorb power from the grid or release power to the grid, respond again to such a grid instruction by again absorbing or releasing power, respectively;
   maintaining multiple grid service models, each representing a grid level process that can involve different power assets, and mappings of power assets to grid service models for grid level processes that can be at least partly fulfilled by those assets;
   determining an optimum disposition of power assets, including selecting assets to fulfill grid level processes modelled by the grid service models; and
   communicating to the selected power assets instructions to attempt to fulfill the grid.

* * * * *